Patented July 30, 1946

2,404,780

UNITED STATES PATENT OFFICE 2,404,780

PROCESS FOR THE CONJOINT POLYMERIZATION OF VINYL CHLORIDE WITH FUMARIC ESTERS

Harold W. Arnold, Wilmington, Del., assignor to E. I. du Pont de Nemours & Company, Wilmington, Del., a corporation of Delaware No Drawing. Application January 23, 1942, Serial No. 427,921

7 Claims. (Cl. 260—78)

This invention relates to valuable compositions of matter and to a process for their preparation. More particularly, it relates to a new and improved process for the conjoint polymerization of vinyl chloride with fumaric esters.

Products resulting from the conjoint polymerization of vinyl chloride with fumaric esters possess many valuable properties which make them very attractive for use in such applications as plastics, coating compositions, films and fibers. The lack of an economical process for the production of these interesting compositions in high state of quality has restricted wider utilization of these products in the synthetic resin field.

This invention has as its object to provide a practical and efficient process for the conjoint polymerization of vinyl chloride with a fumaric ester. Another object is to provide a new and improved process for the conjoint polymerization of vinyl chloride with a fumaric ester that is practicable for large scale operation. Still another object is to produce new and improved synthetic conjoint polymers of vinyl chloride with fumaric esters. Other objects will be apparent from the following description of the invention.

These objects are accomplished by the following invention which comprises polymerizing the polymerizable components of an emulsion of vinyl chloride in admixture with, at least, one fumaric ester in an aqueous medium containing a dissolved salt of perdisulfuric acid, and a dispersing agent selected from the group consisting of

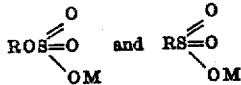

wherein R is an acyclic hydrocarbon of 12 to 18 carbon atoms and M is an alkali metal, said emulsion during said polymerization having a substantially oxygen-free gas thereover.

The exact manner of practicing this invention will vary depending upon the ration of the compounds polymerized, the catalyst and dispersing agent selected; however, the following will illustrate its application.

An aqueous medium containing about 0.1 to 2.0% of a perdisulfate salt and about 1 to 5% of a dispersing agent of the type defined above is adjusted to a pH of about 2–4 by the addition of acids or acid reacting salts. This medium is then placed in a suitable pressure vessel, which is provided with a means of agitation such as stirring or shaking, followed by about one-half its weight of the mixture to be polymerized. The vessel is cooled below the boiling point of the monomeric vinyl chloride and the air in the free space of the vessel is displaced by an inert gas such as nitrogen. The vessel is then closed and heated thereafter at a constant temperature in the range of 20–80° C. with constant or intermittent agitation until polymerization has proceeded to the desired extent.

The following examples, in which the parts are given by weight, further illustrate the practice of the invention.

EXAMPLE I

The following solution is prepared:

| | Parts |
|---|---|
| Water | 464 |
| The sodium salt of sulfonated paraffin oil (a commercial dispersing agent containing about 32% of active ingredient which is essentially identical to that described in Example III of U. S. Patent No. 2,197,800) | 31.2 |
| Ammonium perdisulfate | 1.25 |

The pH of this solution is adjusted to 2.5 by adding a suitable amount of 89% formic acid. Fifty parts of this solution is placed in a glass pressure vessel capable of withstanding elevated pressures and the mixture is then cooled below the boiling point of vinyl chloride. A mixture consisting of 22 parts of vinyl chloride and 3 parts of diethyl fumarate is then added and the vessel sealed. After the contents of the pressure vessel have become completely liquefied, the vessel is agitated in a bath maintained at 40° C. for 24 hours. The resulting milky dispersion is frozen to coagulate the polymer, which is then filtered and washed repeatedly with warm water until substantially all residual dispersing agent has been removed. The polymer, after treatment with a 0.5% borax solution, is washed with methanol to facilitate drying and is thereafter air dried to constant weight. The 22 parts of fine, white granular powder obtained represents a yield of 88 per cent. Chlorine analysis showed the product to contain 87.8 per cent vinyl chloride. The polymer can be molded into strong, tough, light-colored films and bars which have a softening point of 78° C. and a specific gravity of 1.36.

For purposes of comparison in these examples, the softening point of the resin is defined as that temperature ±1° C. at which a molded bar of the material, 2.5×0.5×0.05" rigidly clamped at one end and loaded with a 27.5 gram weight applied 2" from the point of support and in the plane of the 0.5" dimension, deforms 0.06" when the bar is heated in a liquid bath at the rate of 2° C. per minute.

EXAMPLE II

Five hundred parts of the aqueous solution described in Example I is adjusted to a pH of 2.5 by the addition of a suitable amount of 89% formic acid and placed in a glass pressure vessel. The contents are cooled below the boiling point of vinyl chloride and then is added a mixture consisting of 200 parts of vinyl chloride and 50 parts of dimethyl fumarate. The vessel is then swept with nitrogen to remove air and sealed. It is then agitated at 40° C. for 40 hours. The polymer dispersion so obtained is frozen to coagulate the product which is washed with water, borax solution, and methanol as in Example I. The yield of dry polymer is 103 parts or 41%. The properties of this product are shown in the table below:

| | |
|---|---|
| Vinyl chloride per cent | 54.7 |
| Softening point °C | 80 |
| Tensile strength lbs./sq. in | 9,040 |
| Flexural strength lbs./sq. in | 16,300 |

When molded into films and bars this polymer is exceptionally clear and shows little of the discoloration usually in evidence when chlorine-containing resins are subjected to high temperatures. In addition to good solubility in toluene, tri-chlorethylene, methylene chloride, methyl ethyl ketone, and mesityl oxide the polymer is compatible with nitrocellulose.

EXAMPLE III

When 238 parts of vinyl chloride and 13 parts of di-isobutyl fumarate are substituted for the amounts of vinyl chloride and dimethyl fumarate specified in Example II and polymerization and isolation carried out in the same manner, there is obtained 238 parts of dry polymer—a yield of 95%. This product has the properties tabulated below:

| | |
|---|---|
| Vinyl chloride per cent | 94.2 |
| Softening point °C | 78.5 |
| Tensile strength lbs./sq. in | 8,010 |
| Flexural strength lbs./sq. in | 13,750 |

EXAMPLE IV

A mixture of 595 parts of a commercial dispersing agent containing as its active ingredient 30 to 35% of a sulfonated paraffin oil, 23.8 parts of ammonium perdisulfate, and 8500 parts of distilled water is brought to a pH of 2.5 by the addition of formic acid and placed in a nickel lined pressure vessel fitted with a stirrer. After sweeping the vessel free space with nitrogen, 3865 parts of vinyl chloride and 129 parts of diethyl fumarate are forced into the autoclave under nitrogen pressure. The resulting mixture is heated with stirring to 40° C. and maintained at this temperature for approximately 24 hours while polymerization takes place. During this time an additional 540 parts of diethyl fumarate is forced into the autoclave at such a rate that the total number of parts of ester added is related to the density of the polymer dispersion as shown in the following table:

| Dispersion density, g./cc. (23° C.) | Total parts of ester which should be present |
|---|---|
| 1.020 | 129 |
| 1.029 | 234 |
| 1.037 | 288 |
| 1.041 | 328 |
| 1.047 | 428 |
| 1.053 | 428 |
| 1.062 | 482 |
| 1.073 | 550 |
| 1.086 | 610 |
| 1.086 | 669 |

The mixture is heated for one hour after all the diethyl fumarate has been added. The polymer dispersion is then removed from the autoclave, diluted with 25,000 parts of water, heated to 70° C. with stirring, and 500 parts of 10% aluminum sulfate solution added. The coagulated polymer is washed by decantation four times with distilled water, once with 0.25% sodium hydroxide solution, and once with methanol. The polymer is sucked as dry as possible on a filter and spread to dry completely on trays in a current of air. The polymer, obtained in an 80% yield, is a fine white powder containing 19.2% of combined diethyl fumarate and is easily soluble in acetone to give viscous solutions from which fibers and clear, brilliant films can be prepared. The polymer can also be hot-pressed into tough, colorless sheets or molded, either by the compression or injection process, into tough, strong, light-colored objects. Other physical properties are outlined in the table below:

| | |
|---|---|
| Softening point °C | 75 |
| Impact strength ft. lbs./in. of notch | 0.60 |
| Bell flow (ASTM 1940 preprint #108) | 22.3/136° |
| Viscosity, poises (10% solution in cyclohexanone) | 1.3 |

This invention is generic to the conjoint polymerization of vinyl chloride with fumaric esters. In addition to dimethyl, diethyl, and diisobutyl esters of fumaric acid disclosed in the foregoing examples, the following esters of fumaric acid are also suitable; di-n-butyl, di-cyclohexyl, di-benzyl or di-(chloroethyl) esters or the esters of fumaric acid with methyl, ethyl or butyl glycol ethers. The diethyl and dimethyl esters are preferred since they yield higher softening and tougher products which are of great interest for a wide variety of uses. If desired, the copolymerization may be carried out in the presence of other compounds capable of polymerization under the same conditions. For example, such compounds as vinyl esters, acrylates, methacrylates, acrylonitrile, methacrylonitrile, styrene, asymmetrical dichloroethylene or methyl vinyl ketone may be present.

The present invention is not restricted as regards the proportion of vinyl chloride and fumaric esters which may be employed. It is within the scope of this invention to polymerize vinyl chloride with fumaric esters in weight ratios ranging from about 1:19 to about 19:1. It is realized, of course, that the relative proportions of the two monomers employed has an important influence on the properties of the polymerization products. A preferred embodiment of this invention is directed to the preparation of copolymers having ester contents ranging from 1% up to 25 percent. It has been found that the products within this range are characterized by desirable softening points, toughness, impact strengths and other properties which make them very attractive for use in such applications as moldings, coating compositions and fibers. This is more clearly illustrated in Table I which shows the variation in physical properties with increasing ester content for several series of vinyl chloride-fumaric ester copolymers.

Table I

| Diester | Content, percent | Softening point, °C. | Impact strength, ft. lbs./in. of notch | Flexural strength, lbs./sq. in. |
| --- | --- | --- | --- | --- |
| Methyl | 5 | 83.5 | 0.628 | 14,200 |
| Do | 11 | 79.0 | 0.603 | 14,800 |
| Do | 31 | 79.5 | | 15,800 |
| Do | 45 | 80.0 | | 16,300 |
| Ethyl | 5 | 83.0 | 0.50 | 13,600 |
| Do | 10 | 81.0 | 0.62 | 13,700 |
| Do | 15 | 80.0 | 0.64 | 14,000 |
| Do | 20 | 75.0 | 0.61 | 12,500 |
| Do | 25 | 72.0 | 0.54 | 10,500 |
| Do | 30 | 67.0 | 0.50 | |
| Isobutyl | 6 | 78.5 | 0.613 | 13,750 |
| Do | 12.5 | 77.0 | 0.575 | 13,150 |
| Do | 36 | 62.5 | | 12,300 |
| Do | 47 | 55.0 | | 11,000 |

It can be seen from the data in Table I that the products within the preferred range of ester content possess the most attractive properties requisite of a good plastic and that products of increased ester content are less attractive for such purposes as noted above.

The polymerization catalysts encompassed by this invention include the water-soluble salts of perdisulfuric acid. In addition to the ammonium salt disclosed in the examples, there may also be used the sodium, potassium, lithium, barium, and calcium perdisulfates. It is observed that the sulfate ion appears in aqueous solutions of perdisulfates. For this reason, while the water-soluble alkaline earth metals salts are operable, they are not usually used because of their tendency to form a precipitate of the corresponding alkaline earth sulfate. The preferred salts are the ammonium and alkali metal salts. Ammonium perdisulfate is especially suited for economic considerations.

The concentration of perdisulfate salt employed may be varied within wide limits. For instance, amounts of perdisulfates varying from 0.1% to 10% of the quantity of monomer employed are operable. In respect to economy of catalyst, quality of product and rapidity of polymerization, the preferred proportion of perdisulfate salts lies in the range of 0.1% to 4% based on weight of monomer.

As operable dispersing agents in addition to those disclosed in the foregoing examples, there may be mentioned the alkali metal salts of the following long chain alkyl sulfates and sulfonates: dodecyl-1 acid sulfate, tetradecyl-1 acid sulfate, octadecyl-1 acid sulfate, dodecane-1-sulfonic acid, tetradecane-1-sulfonic acid, hexadecane-1-sulfonic acid and octadecane-1-sulfonic acid. The salts of long chain sulfonated paraffin oil hydrocarbons are especially effective dispersants, and need be employed only in small proportions to achieve the desired results. It will be understood that the dispersants to which reference is made above are commercial materials which, because of the methods used in their manufacture and because of the sources of the starting materials, are usually not produced in high state of purity and contain minor constituents which influence the effectiveness of the active ingredient. Polymerization systems containing such ancillary ingredients, which are present adventitiously or added deliberately, are recognized as part of this invention. These ingredients, which are useful only when an operable dispersant is also present, may include inorganic salts, long chain primary alcohols, carbohydrate derivatives, polyvinyl alcohol, etc.

Using the rate of polymerization as a criterion, the invention encompasses the use of dispersing agent active ingredients in concentrations of 0.2 to 5% based on the weight of the aqueous medium used in the copolymerization of vinyl chloride and fumaric esters. Within this range the preferred concentration will in general depend upon the proportion of monomer present, but is usually from 0.5 to 4%. From the standpoint of economy and to facilitate removing the dispersing agent from the polymerized product, it is customary to use the least amount of dispersing agent necessary to bring about the desired rate of polymerization. It is to be understood that when reference is made to the use of definite precentages of dispersing agents, these values are calculated on the basis of the known active ingredient concentration in the commercial dispersants.

It may also be pointed out that the effectiveness of the dispersing agent, especially if small concentrations are employed, is enhanced by agitation of the mixture. Any method of agitation may be used in producing and maintaining the emulsions. The most commonly employed method of mixing is stirring, preferably in vessels containing suitable baffles. Other methods include shaking, tumbling and the use of turbomixers. The dispersing agents operable in this invention are in general useful in forming stable emulsions, which after they are once formed, require little or no agitation thereafter. It has been found, however, that polymerization occurs more rapidly in certain emulsions while they are being agitated. It is, accordingly, preferred to assist the dispersing agent in producing and maintaining the emulsion by mechanical means which may or may not be continuous. It should be emphasized that the dependence of the efficiency of the dispersing agents upon the active ingredient concentration and agitation in no way repudiates the sharp distinction previously noted between the dispersing agents operable in this invention and those which are not. Thus, with most of the inoperable or impractical dispersing agents, it is impossible to obtain the rapid rate characteristic of the operable agents either by most vigorous agitation or by the use of concentrations as high as the solubility of the material will permit. Even in instances where such modifications of systems involving impractical dispersing agents permit sufficient acceleration of the polymerization rate, the process is not practicable because of the expense and operating difficulties entailed by the use of very high proportions of such dispersing agents.

The process of this invention may be carried out in alkaline, acid or neutral media. However, it is preferred to carry out the polymerization in an aqueous medium whose pH may vary from about 1 to about 5 since this this range appears to enhance the polymerization rates of vinyl chloride and fumaric esters. It is realized, however, the pH of the aqueous media used will depend on the nature of the monomers copolymerized with vinyl chloride. For example, when vinyl esters of carboxylic acids are employed, care must be taken to prevent the hydrolysis of the ester. Since the polymerization, in general, proceeds more slowly in environments of low acidity and since high acidity may cause excessive corrosion of the polymerization vessel, it is preferred that the polymerization be carried out at a pH of about 2 to about 4. If it is desired to avoid changes in pH during the course of polymerization, buffer mixtures may be added to the aqueous medium.

The operability of the invention is not confined to any particular proportion of polymerizable monomer or monomers relative to the amount of aqueous media present. Thus, the ratio of the aqueous to the non-aqueous phase may vary between approximately 10:1 and 1:1. In general, it is preferred that the aqueous/non-aqueous ratio shall be approximately 4:1 to 1:1 since for a given reaction vessel the time-space yield is greatly reduced by the use of higher ratios. It can be further said that higher aqueous/non-aqueous ratios usually tend to favor the production of lower molecular weight products. It is also helpful in maintaining an emulsion if the proportion by weight of non-aqueous to aqueous phases is not greater than 1:1. As is well known, the dependence of the rate of vinyl polymerization upon the temperature is very important, and low temperatures cannot be generally used because the corresponding rate of reaction is impracticably low. The present invention can be operated at any temperature above the freezing point of the aqueous phase which is somewhat below 0° C. up to about 80° C., above which the product may be adversely affected by the aqueous medium. It is preferred to employ temperatures in the range of 20° C. to 60° C.

It is realized that the presence of oxygen in th polymerization vessel, while not appearing to have a deleterious effect on the properties of the polymers of this invention, may adversely affect the rate of polymerization in certain cases. In these cases it is, therefore, preferable to displace the air from the polymerization vessel by means of a gas which does not reduce the rate of polymerization. Suitable gases are nitrogen, carbon dioxide, methane and helium. These gases may be passed through the free space of the polymerization vessel until the air has been completely displaced or may be introduced under sufficiently high pressure that the oxygen originally present is so greatly diluted as to have little effect on the rate of polymerization.

The process is not limited to any particular apparatus, but it is important that the reaction vessel shall be constructed of material which has no effect on the rate of polymerization or on the quality of the products and is not affected by the aqueous medium used in carrying out the polymerization. Suitable vessels may be constructed of stainless steel, nickel, silver or lead. Vessels equipped with glass or enamel liners may also be used.

It is within the scope of this invention to employ any of the known procedures for carrying out the polymerization. The entire amounts of the vinyl chloride and fumaric ester may be initially added to the aqueous medium followed by subsequent emulsification and polymerization of the aqueous dispersion. It is well known that the polymerization rate of the monomers operable in this invention may vary to a considerable extent, and it may also be found in copolymerizing vinyl chloride with fumaric esters that one of the monomeric materials polymerizes more rapidly than the other, thus giving rise to products characterized by non-homogeneity and other inferior physical properties. These effects are avoided to a great extent by using the present invention. However, if additional improvement is desired, the polymerization procedure may be modified by mixing initially all of the vinyl chloride and a small proportion of the fumaric ester with the aqueous medium, and thereafter adding small portions of the fumaric ester at about the rate at which the ester is used up. The emulsion process of this invention is also adapted to be carried out in a continuous manner.

At the conclusion of polymerization the products of this invention may be isolated as finely divided powders by a variety of methods. For example, the dispersion may be sprayed into a heated and/or evacuated chamber whereby the water is removed as vapor and the polymer falls to the bottom of the chamber. The polymer may also be isolated by cooling the dispersion below the freezing point of the aqueous medium or by the addition of a large volume of a lower aliphatic alcohol such as methanol or ethanol. The most satisfactory method consists in adding an appropriate amount of an electrolyte solution to the dilute aqueous dispersion with rapid agitation at a temperature just below the point at which the precipitated particles tend to cohere. This procedure yields a polymer in the form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer it is filtered and washed repeatedly with water to remove traces of electrolyte and dispersing agent which may adhere to the particles. Washing with dilute solutions (0.1 to 1%) of caustic soda or ammonium hydroxide assists in removing the last traces of dispersing agent and at the same time yields polymers of improved heat stability. In order to facilitate low temperature drying of the polymers, it is beneficial to employ a final wash with a lower aliphatic alcohol such as methanol or ethanol. Before precipitation it may be advantageous to add to the dispersion small amounts of heat and light stabilizers such as epichlorohydrin, 1-phenoxy-2, 3-epoxypropane, 1-p-tolyloxy-2, 3-epoxypropane, alpha, alpha-dimethyl glycide and ethyl glycidate; cadmium, copper, lead and manganese salts of oleic, linoleic, stearic, ricinoleic, palmitic, lauric and fatty oil acids generally; eugenol, butyl salicylate and guaiacol; glycine, leucine, alanine and the m-octyl ester of C-dimethyl glycine; and 4-cyclohexyl morpholine. In general, monocarboxylic acid amides, preferably of the secondary or N-monosubstituted type, having heavy hydrocarbon residues, preferably in the form of long open chains, may be used advantageously as stabilizers. Specific compounds of this type include: N-(2-methyl-3-hydroxylpropyl) amide of 10-undecenoic acid, N-isobutylamide of naphthenic acids, N-isobutyl lauramide, N-allylamide of 10-undecenoic acid, N-(p-ethoxyphenyl) amide of 10-undecenoic acid, amides of castor oil acids, N-isobutylamide of 10-undecenoic acid, N-isobutylamide of oleic acid, N-isobutylamide of coconut oil acids, and the mixture of N-alkylamides of carbamic acid in which the alkyl groups correspond in size and proportion to those present in the higher alcohols obtained by catalytic hydrogenation of carbon oxides. It may also be of advantage to add small amounts of plasticizers such as dibutyl phthalate, tricresyl phosphate, and dibutyl sebacate.

The products prepared according to this invention may be used for the preparation of plastics, coatings, fibers, films, foils and adhesives. For any of these purposes, the polymers may be combined with or prepared in the presence of plasticizers, stabilizers, fillers, pigments, dyes, softeners, natural resins or other synthetic resins.

In cases in which the products are to be used as coating or impregnating agents for porous materials, it is possible to apply the emulsion directly to the material to be coated without the intermediate isolation of the polymer.

As many apparently widely different embodiments of this invention may be made without departing from the spirit and scope thereof, it is to be understood that this invention is not limited to the specific embodiments shown and described.

I claim:

1. The process for obtaining a resinous material which comprises polymerizing at a temperature ranging from about 0° C.–80° C. the polymerizable components of an emulsion consisting of vinyl chloride in admixture with from 1–25% by weight of said polymerizable components of a fumaric diester of a saturated, single monohydric alcohol containing not more than 2 carbon atoms in an aqueous medium wherein the ratio of aqueous to non-aqueous phase ranges from 10:1 to 1:1, and having a pH ranging from about 1 to 5 and containing a catalytic amount of a dissolved salt of perdisulfuric acid and from .2% to .5%, based on the weight of said aqueous medium, of a dispersing agent selected from the group consisting of

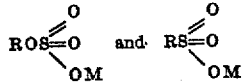

wherein R is an acyclic hydrocarbon of 12–18 carbon atoms and M is an alkali metal.

2. The process for obtaining a resinous material which comprises polymerizing at a temperature ranging from about 0° C.–80° C. the polymerizable components of an emulsion consisting of vinyl chloride in admixture with from 1–25% by weight of said polymerizable components of a fumaric diester of a saturated, single monohydric alcohol containing not more than 2 carbon atoms in an aqueous medium wherein the ratio of aqueous to non-aqueous phase ranges between 10:1 and 1:1 having a pH ranging from about 1 to 5 and containing from .1% to 10%, based on the weight of the monomer present, of a dissolved salt of perdisulfuric acid and from .2% to 5%, based on the weight of said aqueous medium, of a dispersing agent selected from the group consisting of

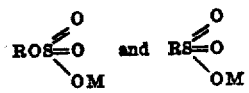

wherein R is an acyclic hydrocarbon of 12–18 carbon atoms and M is an alkali metal, said emulsion during said polymerization having a substantially inert, oxygen-free gas thereover.

3. The process for obtaining a resinous material which comprises polymerizing at a temperature ranging from 0° C.–80° C. the polymerizable components of an aqueous emulsion consisting of vinyl chloride in admixture with an amount of about 5%, based on the total polymerizable components, of a fumaric acid diester of a saturated, aliphatic, single monohydric alcohol containing not more than 2 carbon atoms, said emulsion being in an aqueous medium wherein the ratio of aqueous to non-aqueous phase is between 10:1 and 1:1 having a pH ranging from about 1–5 and containing from about .1% to 10%, based on the weight of monomer present, of a dissolved salt of perdisulfuric acid, and from about .2%–5%, based on the weight of said aqueous medium, of a dispersing agent selected from the group consisting of

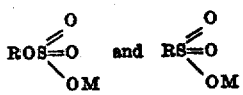

wherein R is an acyclic hydrocarbon of 12–18 carbon atoms and M is an alkali metal.

4. A process for obtaining a resinous material which comprises polymerizing at a temperature ranging from 20° C.–60° C. the polymerizable components of an emulsion consisting of vinyl chloride in admixture with from 1%–25% by weight of a fumaric diester derived from the esterification of fumaric acid with a saturated, single monohydric alcohol containing not more than 2 carbon atoms, said emulsion being in an aqueous medium wherein the ratio of aqueous to non-aqueous phase is between 10:1 and 1:1 having a pH ranging from about 2–4 and containing from about 0.1%–4%, based on the weight of the monomer present, of a dissolved salt of perdisulfuric acid and from about 0.5%–4%, based on the weight of the aqueous medium, of a dispersing agent from the group consisting of

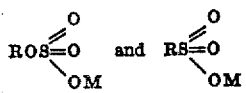

wherein R is an acyclic hydrocarbon of 12–18 carbon atoms and M is an alkali metal, said emulsion during said polymerization having a substantially inert, oxygen-free gas thereover.

5. The process for obtaining a resinous material which comprises polymerizing at a temperature ranging from 20° C.– 60° C. the polymerizable components of an emulsion consisting of vinyl chloride in admixture with from 1%–25% by weight of the diethyl ester of fumaric acid, said emulsion being in an aqueous medium having a ratio of aqueous to non-aqueous phase of from 4:1 to 1:1 and having a pH ranging from 2–4 and containing from about 0.1%–4%, based on the weight of monomer present, of ammonium perdisulfate, and from about 0.5%–4%, based on the weight of the aqueous medium, of the sodium salt of sulfonated paraffin oil, said emulsion during said polymerization being in contact with an atmosphere of nitrogen.

6. A process for obtaining a resinous material which comprises polymerizing at a temperature ranging from about 20° C. to 60° C. the polymerizable components of an emulsion consisting of vinyl chloride in admixture with from 1–25% by weight of said polymerizable components of the diethyl ester of fumaric acid, said emulsion being in an aqueous medium at a pH of from about 2–4, having a ratio of aqueous to non-aqueous phase ranging between 10:1 and 1:1, and containing from .1% to 4%, based on the weight of monomer, of a dissolved salt of perdisulfuric acid and from .2% to 5%, based on the weight of the aqueous medium, of a dispersing agent selected from the group consisting of

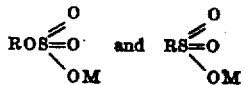

wherein R is an acyclic hydrocarbon of 12–18 carbon atoms and M is an alkali metal, said emulsion during said polymerization having a substantially inert, oxygen-free gas thereover.

7. The process for obtaining a resinous material which comprises polymerizing at a temperature ranging from about 20° C.–60° C. the polymerizable components of an emulsion consisting of vinyl chloride in admixture with from 1–25% by weight of said polymerizable components of the dimethyl ester of fumaric acid, said emulsion being in an aqueous medium wherein the ratio of aqueous to non-aqueous phase ranges from 4:1 to 1:1, having a pH of from about 2–4 and containing from about 0.1% to 4%, based on the weight of monomer present, of a dissolved salt of perdisulfuric acid and from 0.5% to 4%, based on the weight of the aqueous medium of a dispersing agent selected from the group consisting of

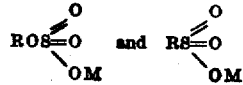

wherein R is an acyclic hydrocarbon of 12–18 carbon atoms and M is an alkali metal, said emulsion during said polymerization having a substantially inert oxygen-free gas thereover.

HAROLD W. ARNOLD.

Certificate of Correction

Patent No. 2,404,780.     July 30, 1946.

HAROLD W. ARNOLD

It is hereby certified that errors appear in the printed specification of the above numbered patent requiring correction as follows: Column 9, line 39, claim 1, for ".5%" read *5%*; column 10, line 54, claim 5, for "aqeuous" read *aqueous*; and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.*

.2% to 5%, based on the weight of the aqueous medium, of a dispersing agent selected from the group consisting of

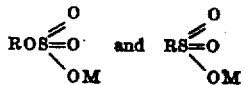

wherein R is an acyclic hydrocarbon of 12–18 carbon atoms and M is an alkali metal, said emulsion during said polymerization having a substantially inert, oxygen-free gas thereover.

7. The process for obtaining a resinous material which comprises polymerizing at a temperature ranging from about 20° C.–60° C. the polymerizable components of an emulsion consisting of vinyl chloride in admixture with from 1–25% by weight of said polymerizable components of the dimethyl ester of fumaric acid, said emulsion being in an aqueous medium wherein the ratio of aqueous to non-aqueous phase ranges from 4:1 to 1:1, having a pH of from about 2–4 and containing from about 0.1% to 4%, based on the weight of monomer present, of a dissolved salt of perdisulfuric acid and from 0.5% to 4%, based on the weight of the aqueous medium of a dispersing agent selected from the group consisting of

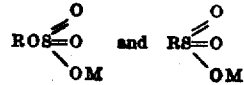

wherein R is an acyclic hydrocarbon of 12–18 carbon atoms and M is an alkali metal, said emulsion during said polymerization having a substantially inert oxygen-free gas thereover.

HAROLD W. ARNOLD.

Certificate of Correction

Patent No. 2,404,780.  July 30, 1946.

HAROLD W. ARNOLD

It is hereby certified that errors appear in the printed specification of the above numbered patent requiring correction as follows: Column 9, line 39, claim 1, for ".5%" read 5%; column 10, line 54, claim 5, for "aqeuous" read *aqueous*; and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.*